(12) United States Patent
Mao et al.

(10) Patent No.: US 8,773,748 B2
(45) Date of Patent: Jul. 8, 2014

(54) LIGHT MODULATOR PIXEL UNIT AND MANUFACTURING METHOD THEREOF

(75) Inventors: Jianhong Mao, Shanghai (CN); Deming Tang, Shanghai (CN); Fengqin Han, Shanghai (CN)

(73) Assignee: Lexvu Opto Microelectronics Technology (Shanghai) Ltd, Shanghai (CN)

( * ) Notice: Subject to any disclaimer, the term of this patent is extended or adjusted under 35 U.S.C. 154(b) by 0 days.

(21) Appl. No.: 13/810,107

(22) PCT Filed: Jan. 26, 2011

(86) PCT No.: PCT/CN2011/070641
§ 371 (c)(1),
(2), (4) Date: Jan. 14, 2013

(87) PCT Pub. No.: WO2012/006877
PCT Pub. Date: Jan. 19, 2012

(65) Prior Publication Data
US 2013/0107349 A1 May 2, 2013

(30) Foreign Application Priority Data
Jul. 15, 2010 (CN) .......................... 2010 1 0230027

(51) Int. Cl.
G02B 26/00 (2006.01)
G02B 26/08 (2006.01)
G02B 26/02 (2006.01)

(52) U.S. Cl.
CPC .......... *G02B 26/001* (2013.01); *G02B 26/0808* (2013.01); *G02B 26/02* (2013.01)
USPC ....................................................... 359/290

(58) Field of Classification Search
CPC ............. G02B 26/001; G02B 26/0808; G02B 26/0841; G02F 1/21; G02F 1/225
USPC .......................... 359/260, 291, 295, 572, 578
See application file for complete search history.

(56) References Cited

U.S. PATENT DOCUMENTS 5,986,796 A 11/1999 Miles
7,372,613 B2 5/2008 Chui et al.
(Continued)

FOREIGN PATENT DOCUMENTS

CN 1713409 A 12/2005
CN 1755490 A 4/2006
(Continued)

OTHER PUBLICATIONS

English-Language Translation for JP 2002-62491 A.*
(Continued)

*Primary Examiner* — David N Spector
(74) *Attorney, Agent, or Firm* — Harness, Dickey & Pierce, P.L.C.

(57) ABSTRACT

A light modulator pixel unit and a method for manufacturing the same are provided. The light modulator pixel unit includes top, movable and bottom electrodes. Under control of a control circuit, the movable electrode may shift to first, second and third positions corresponding to modulations of first, second and third monochromatic lights, respectively. When the movable electrode is at a certain position, the incident light corresponding to the position may be divided into two parts, one is reflected by the top electrode, and the other one may bypass the top electrode and be reflected by the movable electrode. The two parts may interfere destructively. The light modulator pixel unit of the present invention can control monochromatic lights of three special wavelengths by time division, and enable color control and gray control. The unit is applicable in the field of projection display and panel system.

20 Claims, 10 Drawing Sheets

(56) References Cited

U.S. PATENT DOCUMENTS

| | | | |
|---|---|---|---|
| 7,403,180 | B1 | 7/2008 | Silverstein et al. |
| 7,902,602 | B2 | 3/2011 | Koo et al. |
| 2002/0015215 | A1 | 2/2002 | Miles |
| 2013/0155487 | A1* | 6/2013 | Mao et al. .................. 359/290 |

FOREIGN PATENT DOCUMENTS

| | | | |
|---|---|---|---|
| CN | 101595416 A | | 12/2009 |
| JP | 2002-62491 A | | 2/2002 |
| WO | WO-02/084375 A1 | | 10/2002 |

OTHER PUBLICATIONS

Second Chinese Office Action regarding Application No. 201010230027.1, dated Jul. 17, 2013. Partial English translation provided by Unitalen Attorneys at Law.

International Search Report (in Chinese with English translation) and Written Opinion (in Chinese) for PCT/CN2011/070641, mailed Apr. 28, 2011; ISA/CN.

* cited by examiner

LIGHT MODULATOR PIXEL UNIT AND MANUFACTURING METHOD THEREOF

CROSS REFERENCE TO RELATED APPLICATIONS

The present application is a Section 371 National Stage Application of International Application No. PCT/CN2011/070641, filed on Jan. 26, 2011, which claims priority to Chinese patent application No. 201010230027.1, filed on Jul. 15, 2010, and entitled "Light Modulator Pixel Unit and Method for Manufacturing the Same", the entire disclosures of which are incorporated herein by reference.

FIELD OF THE DISCLOSURE

The present disclosure relates to a light modulator, and more particularly, to a light modulator pixel unit in a micro display system and a method for manufacturing the same.

BACKGROUND OF THE DISCLOSURE

A light modulator is a critical to a projection system. The conventional light modulator includes a micro-electro-mechanical system (MEMS). The light modulator controls the MEMS to move by adjusting an electrical signal applied on the MEMS, such that lights incident to the light modulator may be modulated using the movement of the MEMS, and thereby outputting lights with certain grayscales.

Normally, a light modulator may include a plurality of pixel units arranged in array. Currently, there are two kinds of light modulator pixel units: digital mirror devices (DMD) which apply light reflection principle and grating light valves (GLV) which apply light diffraction principles. However, a single DMD pixel unit consumes high power, and the overall power consumption is higher especially when applied in a high resolution micro display system, while a single GLV pixel unit consumes low power and the overall power consumption is also low. Besides, GLV has advantages like good analogous grayscale, high optical efficiency and high modulation speed, thereby becoming the current mainstream technology.

A conventional light modulator pixel unit is disclosed in an international patent Application No. PCT/US2002/009602, filed on Mar. 27, 2002. The light modulator pixel unit applies GLV. Referring to FIG. 1, a GLV 100 includes: a semiconductor substrate 101; a reflection layer 102 on the semiconductor substrate 101, where the reflection layer 102 has a first light reflection surface 103 on a side away from the semiconductor substrate 101 and is made of metal; and a transparent insulation layer 107 on the first light reflection surface 103. At least one reflection strip 104 is arranged above the first light reflection surface 103 and the transparent insulation layer 107, where the reflection strips 104 are spaced away from the first light reflection surface 103. The reflection strips 104, made of metal, have a second light reflection surface 106. At least one opening 105 is configured between the reflection strips 104, enabling lights to get through and be incident onto the first light reflection surface 103 below.

An electrostatic force is applied between the reflection strips 104 and the reflection layer 102, therefore the reflection strips 104 is deformed to contact with the transparent insulation layer 107. The shifting distance of the reflection strips is depended on the thickness of the transparent insulation layer 107. When the electrostatic force is withdrawn, the reflection strips 104 move back to their original positions (i.e., the positions prior to the deformation).

For example, the conventional GLV may modulate lights with a wavelength of $\lambda$ as follows: the reflection strips 104 shift towards to the semiconductor substrate 101 under the electrostatic force, the shifting distance may be configured to be an odd times of $\lambda/4$, such that a diffraction of the lights incident onto the GLV surface may occur. Specifically, the incident lights may be divided into a first part and a second part on the surface of a GLV 100. The first part may be reflected by the second light reflection surface 106. The second part may be incident onto the first light reflection surface 103 through the openings 105, and reflected by the first light reflection surface 103. The second part may be diffracted around the reflection strips 104, so that the second part may bypass the reflection strips 104 and transmit upwards. The second part, reflected by the first light reflection surface 103 and thereafter diffracted around the reflection strips 104, has the same frequency as the first part. A phase difference between the first and second parts is an odd times of $\lambda/2$. Therefore, the second part may interfere destructively with the first part over the reflection strips 104, which makes the space over the GLV totally dark without any lights being output. When the electrostatic force which controls the reflection strips 104 is withdrawn, the reflection strips 104 may move back to their original positions. The lights incident to the GLV may be divided into a third part and a fourth part. The third part may be reflected by the second light reflection surface 106. The fourth part may be incident onto the first light reflection surface 103 through the openings 105, and reflected by the first light reflection surface 103. The fourth part reflected by the first light reflection surface 103 may be diffracted around the reflection strips 104, so that the fourth part may bypass the reflection strips 104 and transmit upwards. On this occasion, the phase difference between the third and fourth parts may be a distance other than an odd times of $\lambda/2$. Therefore, the first and second parts may be output together.

From above analysis, the shifting distance of the reflection strips 104 in the GLV are configured based on the wavelength of the specific lights to be modulated, and so does the thickness of the transparent insulation layer. Once the thickness of the transparent insulation layer 107 is determined, the corresponding shifting distance may be fixed, and the GLV may modulate the lights corresponding to the shifting distance. However, when the lights have other wavelengths, the GLV may not be able to modulate. That is because the shifting distance of the reflection strips in the conventional GLV are configured based on the wavelength of the specific lights to be modulated, and the shifting distance can not be adjusted by changing the electrostatic force. That means only one kind of lights with a same wavelength may be modulated, i.e., the conventional GLV can only modulate lights with one color. To be applied into a multicolor display system (in which multicolor pixels need to be generated), at least three conventional GLVs are needed to cooperate correspondingly, where a first GLV may be dedicated to modulate red lights, a second GLV may be dedicated to modulate blue lights and a third GLV may be dedicated to modulate green lights. The three GLVs may work successively under the control of a control circuit and output corresponding lights with certain grayscales (including red lights, green lights and blue lights), respectively. The lights output from the conventional GLV need to be filtered by a filtering lens to keep the multicolor pixels with a certain contrast when seen by an observer. Only the zero-order lights or the first-order lights may reach the observer's visual system, and the filtered lights may be composed in the observer's visual system, thereby generating a multicolor pixel.

The conventional light modulator requires three GLVs to generate one multicolor pixel, which takes a large area of a chip and is not suitable for micro display systems. Therefore, a new light modulator is desired to meet the requirements of the micro display systems.

BRIEF SUMMARY OF THE DISCLOSURE

Embodiments of the present disclosure provide a novel light modulator pixel unit, in which the modulations of red lights, green lights and blue lights may be performed within a same chip, thereby meeting the requirements of micro display systems.

Embodiments of the present disclosure provide a light modulator pixel unit, including:

a substrate;

a bottom electrode, formed above the substrate and electrically coupled to a first control end of a control circuit;

a top electrode, formed above the substrate and electrically coupled to a third control end of the control circuit, where the top electrode may be a semi-transparent metal thin film; and a movable electrode, formed between the bottom electrode and the top electrode, and electrically coupled to a second control end of the control circuit, where a surface of the movable electrode facing the top electrode may be a light reflection surface, the movable electrode may move perpendicularly to the light reflection surface, and there formed insulation material between the movable electrode and the top electrode, and between the movable electrode and the bottom electrode;

where the top electrode, the movable electrode and the bottom electrode have corresponding positions, the movable electrode has an area smaller than that of the top electrode, under the control of the control circuit, the movable electrode may shift to a first position, a second position and a third position respectively; when the movable electrode is at the first position, two parts of a first light incident to the light modulator pixel unit may interfere destructively, where one part may include lights reflected by the top electrode, and another part may include lights transmitting through the top electrode, being reflected by the movable electrode and transmitting through the top electrode again; when the movable electrode is at the second position, two parts of a second light incident to the light modulator pixel unit may interfere destructively, where one part may include lights reflected by the top electrode, and another part may include lights transmitting through the top electrode, being reflected by the movable electrode and transmitting through the top electrode again; and when the movable electrode is at the third position, two parts of a third light incident to the light modulator pixel unit may interfere destructively, where one part may include lights reflected by the top electrode, and another part may include lights transmitting through the top electrode, being reflected by the movable electrode and transmitting through the top electrode again, where the first, second and third lights are three monochromatic lights.

Optionally, the control circuit may be formed in the substrate or formed in another substrate.

Optionally, the bottom electrode is electrically insulated from the substrate, and the top electrode is electrically insulated from the substrate.

Optionally, the light modulator pixel unit may further includes:

an interlayer dielectric (ILD) layer, formed on the substrate;

a cavity, formed in the ILD layer, where the cavity has cavity walls, and includes a first portion at the lower part of the cavity and a second portion at the upper part of the cavity;

where the bottom electrode is formed in the ILD layer between the first portion and the substrate;

where the top electrode is formed in the ILD layer above the second portion; and the movable electrode is formed in the cavity and spaced away from the cavity walls, so as to hold the movable electrode's motion.

Optionally, the insulation material between the movable electrode and the top electrode, and between the movable electrode and the bottom electrode, may apply the ILD layer or formed additionally.

Optionally, the ILD layer or the additionally formed insulation material may be silicon oxide, silicon oxynitride, silicon carbide, silicon nitride, or a combination thereof.

Optionally, at least one second conducting plugs may be formed inside the ILD layer, the at least one second conducting plugs electrically couple the second control end to the movable electrode, and the at least one second conducting plugs are central symmetrical with the movable electrode.

Optionally, the top electrode may include metal, and have a thickness ranging from about 30 angstroms to about 300 angstroms, and the metal may be Ag, Al, Cu, Ti, Pt, Au, Ni, Co, or a combination thereof.

Optionally, the movable electrode may include metal, and have a thickness ranging from about 800 angstroms to about 10000 angstroms, and the metal may be Ag, Al, Cu, Ti, Pt, Au, Ni, Co, or a combination thereof.

Accordingly, embodiments of the present disclosure further provide a method for forming a light modulator pixel unit, including:

providing a substrate;

forming a bottom electrode above the substrate and electrically coupled to a first control end of a control circuit;

forming a top electrode above the substrate and electrically coupled to a third control end of the control circuit, where the top electrode may be a semi-transparent metal thin film; and forming a movable electrode above the substrate and between the bottom electrode and the top electrode, the movable electrode being electrically coupled to a second control end of the control circuit, there being formed insulation material between the movable electrode and the top electrode, and between the movable electrode and the bottom electrode, and a surface of the movable electrode facing the top electrode being a light reflection surface;

where the movable electrode may move perpendicularly to the light reflection surface to a first position, a second position and a third position, respectively; when the movable electrode is at the first position, two parts of a first light incident to the light modulator pixel unit may interfere destructively, where one part may include lights reflected by the top electrode, and another part may include lights transmitting through the top electrode, being reflected by the movable electrode, and transmitting through the top electrode again; when the movable electrode is at the second position, two parts of a second light incident to the light modulator pixel unit may interfere destructively, where one part may include lights reflected by the top electrode, and another part may include lights transmitting through the top electrode, being reflected by the movable electrode, and transmitting through the top electrode again; and when the movable electrode is at the third position, two parts of a third light incident to the light modulator pixel unit may interfere destructively, where one part may include lights reflected by the top electrode, and another part may include lights transmitting through the top electrode, being reflected by the movable electrode and transmitting through the top electrode again, where the first, second and third lights are three monochromatic lights; where the top electrode, the movable electrode and the bottom electrode have corresponding positions, and the movable electrode has an area smaller than that of the top electrode.

Optionally, the control circuit may be formed in the substrate or in another substrate.

Optionally, the bottom electrode is electrically insulated from the substrate, and the top electrode is electrically insulated from the substrate.

Optionally, the method unit may further includes:

forming an interlayer dielectric (ILD) layer on the substrate; and forming a cavity in the ILD layer, where the cavity has cavity walls, and includes a first portion at the lower part of the cavity and a second portion at the upper part of the cavity;

where the bottom electrode is formed in the ILD layer between the first portion and the substrate;

where the top electrode is formed in the ILD layer above the second portion; and where the movable electrode is formed in the cavity and spaced away from the cavity walls, so as to hold the movable electrode's motion.

Optionally, the insulation material between the movable electrode and the top electrode, and between the movable electrode and the bottom electrode, may apply the ILD layer or formed additionally.

Optionally, the method may further include:

forming at least one second conducting plugs inside of the ILD layer, where the at least one second conducting plugs electrically couple the second control end to the movable electrode, and the at least one second conducting plugs are central symmetrical with the movable electrode.

Optionally, the top electrode may include metal, and have a thickness ranging from about 30 angstroms to about 300 angstroms, and the metal may be Ag, Al, Cu, Ti, Pt, Au, Ni, Co, or a combination thereof.

Compared with the prior art, embodiments of the present disclosure have advantages below. A light modulator pixel unit is provided, including a bottom electrode, a top electrode and a movable electrode formed on a substrate. The movable is formed between the top electrode and the bottom electrode, has a light reflection surface and may shift vertically with the light reflection surface. Embodiments of the present disclosure make use of the shifting of the movable electrode between the top electrode and the bottom electrode, so that the movable electrode may shift to a first position, a second position and a third position. When the movable electrode is at the first position, two parts of a first light incident to the light modulator pixel unit may interfere destructively, where one part may include lights reflected by the top electrode, and another part may include lights transmitting through the top electrode, being reflected by the movable electrode and transmitting through the top electrode again; when the movable electrode is at the second position, two parts of a second light incident to the light modulator pixel unit may interfere destructively, where one part may include lights reflected by the top electrode, and another part may include lights transmitting through the top electrode, being reflected by the movable electrode and transmitting through the top electrode again; and when the movable electrode at the third position, two parts of a third light incident to the light modulator pixel unit may interfere destructively, where one part may include lights reflected by the top electrode, and another part may include lights transmitting through the top electrode, being reflected by the movable electrode and transmitting through the top electrode again, where the first, second and third lights are three monochromatic lights with three specific wavelengths. The light modulator pixel unit provided by embodiments of the present disclosure may modulate three monochromatic lights with three specific wavelengths, so that the light modulator pixel unit may be applicable in micro display systems.

Lights need to be filtered in the conventional GLV, and thereafter they may be composed in the observer's visual system. However, the first, second and third lights output by the light modulator pixel unit may be composed directly in the observer's visual system. Therefore, the light modulator pixel unit provided by embodiments of the present disclosure may use the lights more efficiently. The power consumption of the light modulator pixel unit may be less than that of the three conventional GLVs, therefore, using a light modulator including the pixel units of the present disclosure may achieve a less overall power consumption.

BRIEF DESCRIPTION OF THE DRAWINGS

The above described and other features and advantages will become more apparent to those of ordinary skill in the art by describing in detail exemplary embodiments with reference to the attached drawings. The same reference numbers may be used in different drawings to identify the same or similar elements. The figures are not drawn to scale, and it is noted that the drawings are provided for illustrative purposes only.

DETAILED DESCRIPTION OF THE DISCLOSURE

Figure 1:
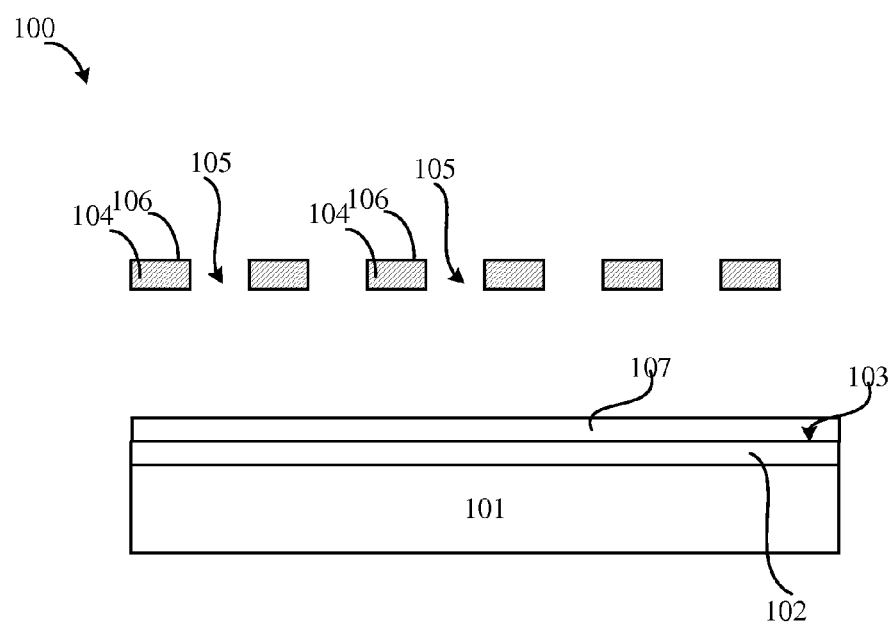
FIG. 1 is a schematic structural view of a conventional GLV.

Inventors of the present disclosure found that a conventional multicolor pixel unit needs three GLVs to work together, respectively adapted for modulating red lights, green lights and blue lights, which may take a large area of a chip. Therefore, the conventional multicolor pixel units cost too much and may not be suitable for micro display systems.

To solve the technical problem described above, embodiments of the present disclosure provide a light modulator pixel unit, in which lights are modulated using the light interference principles, thereby realizing modulating three color lights within one light modulator pixel unit. The light modulator pixel unit provided by embodiments of the present disclosure takes less chip area and has lower cost, so that it may be ideally applied in a micro display system. Besides, the light modulator pixel unit may use the lights more efficiently, therefore, the power consumption of a single light modulator pixel unit may be reduced, and so as the overall power consumption of the light modulator.

Specifically, a light modulator pixel unit provided according to one embodiment of the present disclosure may include:

a substrate;

a bottom electrode, formed above the substrate and electrically coupled to a first control end of a control circuit;

a top electrode, formed above the substrate and electrically coupled to a third control end of the control circuit, where the top electrode may be a semi-transparent metal thin film; and a movable electrode, formed between the bottom electrode and the top electrode, and electrically coupled to a second control end of the control circuit, where a surface of the movable electrode facing the top electrode may be a light reflection surface, the movable electrode may move perpendicularly to the light reflection surface, and there formed insulation material between the movable electrode and the top electrode, and between the movable electrode and the bottom electrode;

where the top electrode, the movable electrode and the bottom electrode have corresponding positions, the movable electrode has an area smaller than that of the top electrode, under the control of the control circuit, the movable electrode may shift to a first position, a second position and a third position respectively; when the movable electrode is at the first position, two parts of a first light incident to the light modulator pixel unit may interfere destructively, where one part may include lights reflected by the top electrode, and another part may include lights transmitting through the top electrode, being reflected by the movable electrode and transmitting through the top electrode again; when the movable electrode is at the second position, two parts of a second light incident to the light modulator pixel unit may interfere destructively, where one part may include lights reflected by the top electrode, and another part may include lights transmitting through the top electrode, being reflected by the movable electrode and transmitting through the top electrode again; and when the movable electrode is at the third position, two parts of a third light incident to the light modulator pixel unit may interfere destructively, where one part may include lights reflected by the top electrode, and another part may include lights transmitting through the top electrode, being reflected by the movable electrode and transmitting through the top electrode again, where the first, second and third lights are three monochromatic lights.

Hereafter, device structures of light modulator pixel units provided by embodiments of the present disclosure will be illustrated.

Figure 2:
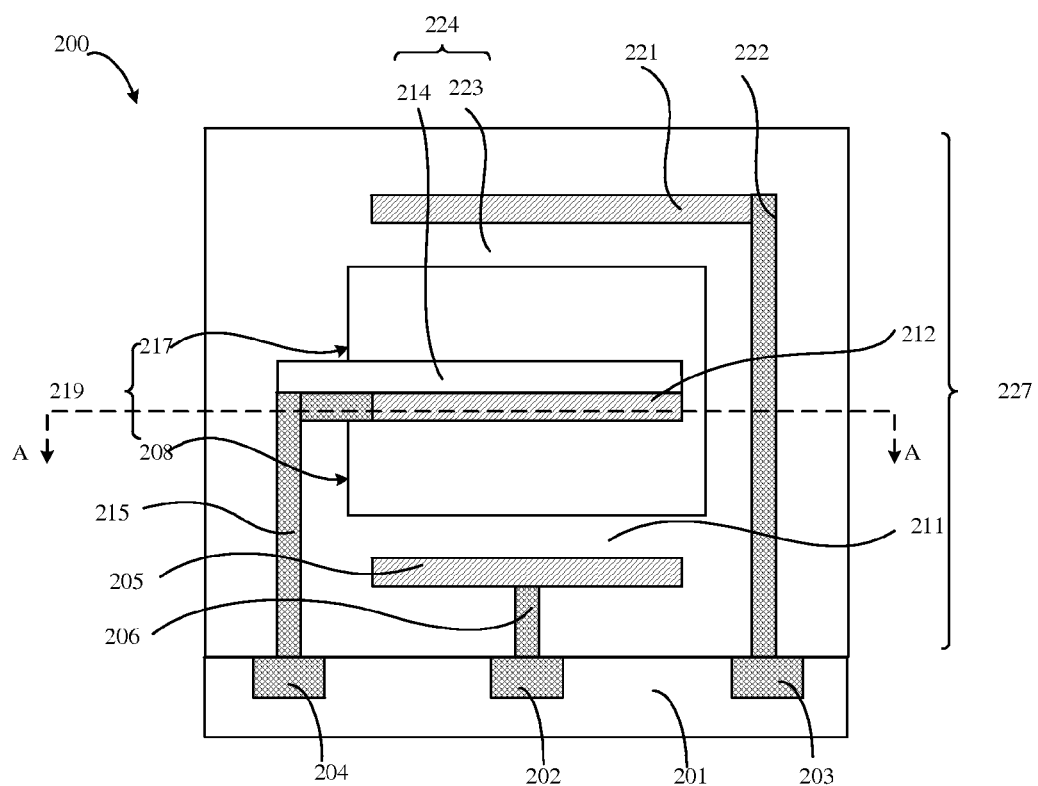
FIG. 2 is a schematic structural view of a light modulator pixel unit according to an embodiment of the present disclosure.

Referring to FIG. 2, a schematic structural view of a light modulator pixel unit 200 according to an embodiment of the present disclosure, the light modulator pixel unit 200 includes:

a substrate 201;

a bottom electrode 205, formed above the substrate 201 and electrically coupled to a first control end 202 of a control circuit;

a top electrode 221, formed above the substrate 201 and electrically coupled to a third control end 203 of the control circuit, where the top electrode 221 may be a semi-transparent metal thin film; and a movable electrode 212, formed between the bottom electrode 205 and the top electrode 221, and electrically coupled to a second control end 204 of the control circuit, where a surface of the movable electrode 212 facing the top electrode 221 may be a light reflection surface, the movable electrode 212 may move perpendicularly to the light reflection surface, and there formed insulation material between the movable electrode 212 and the top electrode 221, and between the movable electrode 212 and the bottom electrode 205;

where the top electrode 221, the movable electrode 212 and the bottom electrode 205 have corresponding positions, the movable electrode 212 has an area smaller than that of the top electrode, under the control of the control circuit, the movable electrode may shift to a first position, a second position and a third position respectively; when the movable electrode 212 is at the first position, two parts of a first light incident to the light modulator pixel unit 200 may interfere destructively, where one part may include lights reflected by the top electrode 221, and another part may include lights transmitting through the top electrode 221, being reflected by the movable electrode 212 and transmitting through the top electrode 221 again; when the movable electrode 212 is at the second position, two parts of a second light incident to the light modulator pixel unit 200 may interfere destructively, where one part may include lights reflected by the top electrode 221, and another part may include lights transmitting through the top electrode 221, being reflected by the movable electrode 212 and transmitting through the top electrode 221 again; and when the movable electrode 212 is at the third position, two parts of a third light incident to the light modulator pixel unit 200 may interfere destructively, where one part may include lights reflected by the top electrode 221, and another part may include lights transmitting through the top electrode 221, being reflected by the movable electrode 212 and transmitting through the top electrode 221 again, where the first, second and third lights are three monochromatic lights.

Specifically, in an embodiment, the substrate 201 may be a semiconductor substrate, including Si, Ge, GaAs, or the like. In some embodiments, the substrate 201 may be a glass substrate. The following description will employ the substrate 201 being a semiconductor substrate as an example for illustrating.

The control circuit is adapted for applying control signals to components in the substrate 201 (such as the control ends coupling to the movable electrode 212, the top electrode 221 and the bottom electrode 205). The control circuit includes the first control end 202, the second control end 204 and the third control circuit end 203. The control circuit may be formed in the substrate 201 (when the substrate 201 is a semiconductor substrate), or may be formed in another substrate and coupled to the components in the substrate 201 through conducting structures.

Referring still to FIG. 2, in an embodiment, the light modulator pixel unit 200 may further include:

an interlayer dielectric (ILD) layer 227, formed on the substrate 201;

a cavity 219, formed in the ILD layer 227, where the cavity 219 has cavity walls, and includes a first portion 208 at the lower part of the cavity 219 and a second portion 217 at the upper part of the cavity 219, the cavity 219 is adapted for providing space for holding the movable electrode 212's motion;

where the bottom electrode 205 is formed above the substrate 201, electrically insulated from the substrate 201 and electrically coupled to the first control circuit 202;

where the top electrode 221 is formed in the ILD layer 227 above the second portion 217 of the cavity 219; and where the movable electrode 212 is formed in the cavity 219 and spaced away from the cavity walls of the cavity 219, so as to hold the movable electrode 212's motion.

The movable electrode 212 is formed between the bottom electrode 205 and the top electrode 221, electrically coupled to the second control end 204. The face of the movable electrode 212, facing the top electrode 221, is the light reflection surface, and the movable electrode 212 may move perpendicularly to the light reflection surface. Insulation material is formed between the top electrode 221 and the movable electrode 212, and between the movable electrode 212 and the bottom electrode 205. It should be noted that the light reflection surface described in embodiments of the present disclosure specifically means a surface which may reflect parallel lights incident thereto as parallel lights (i.e., the reflection surface may mirror reflect the incident lights).

In an embodiment, the movable electrode 212 is formed in the cavity 219 and spaced away from the cavity walls of the cavity 219, so that the movable electrode 212 may shift. The movable electrode 212 is coupled to the second control circuit 204. The face of the movable electrode 212, facing the top electrode 221, is the light reflection surface, and the movable electrode 212 may move perpendicularly to the light reflection surface.

Further, a top insulation layer 224 is formed between the movable electrode 212 and the top electrode 221, including a second top insulation layer 214 on the movable electrode 212 and a first top insulation layer 223 between the top electrode 221 and the second top insulation layer 214, where the first top insulation layer 223 directly applies part of the ILD layer 227. In some other embodiments, additional insulation material may be formed beneath the top electrode 221, so as to electrically insulate the movable electrode 212 and the top electrode 221.

A bottom insulation layer 221 is formed between the movable electrode 212 and the bottom electrode 205. In an embodiment, the bottom insulation layer 221 directly applies part of the ILD layer 227. In some other embodiments, additional insulation material may be formed between the movable electrode 212 and the bottom electrode 205, so as to electrically insulate the movable electrode 212 and the bottom electrode 205.

The top electrode 221, the movable electrode 212 and the bottom electrode 205 have corresponding positions. The movable electrode 212 has an area smaller than that of the top electrode 221. Under the control of the control circuit, the movable electrode 212 may shift to a first position, a second position and a third position, respectively. When the movable electrode 212 is at the first position, there is no gap but only the top insulation layer 224 between the top electrode 221 and the movable electrode 212. A first light incident to the light modulator pixel unit 200 may be divided into two parts, one includes lights reflected by the top electrode 221, and the other one includes lights transmitting through the top electrode 221, being reflected by the movable electrode 212 and transmitting through the top electrode 221 again. The two parts of the first light may interfere destructively. When the movable electrode 212 is at the second position, there are gaps between the top electrode 221 and the movable electrode 212, and between the movable electrode 212 and the bottom electrode 205. A second light incident to the light modulator pixel unit 200 may be divided into two parts, one includes lights reflected by the top electrode 221, and the other one includes lights transmitting through the top electrode 221, being reflected by the movable electrode 212 and transmitting through the top electrode 221 again. The two parts of the second light may interfere destructively. When the movable electrode 212 is at the third position, there is no gap but only the bottom insulation layer 221 between the bottom electrode 205 and the movable electrode 212. A third light incident to the light modulator pixel unit 200 may be divided into two parts, one includes lights reflected by the top electrode 221, and the other one includes lights transmitting through the top electrode 221, being reflected by the movable electrode 212 and transmitting through the top electrode 221 again. The two parts of the third light may interfere destructively. The first, second and third lights are three monochromatic lights with three specific wavelengths, where the first light is blue, the second light is green and the third light is red. Preferably, wavelengths of the first, second and third lights may be configured, so that the modulation sensitivity and effect of the light modulator pixel unit may be improved. For example, the first light is blue with a wavelength ranging from about 465 nm to about 480 nm, the second light is green with a wavelength ranging from about 525 nm to about 540 nm, and the third light is red with a wavelength ranging from about 675 nm to about 695 nm. On the premise that the first, second and third lights are three monochromatic lights, each of them has a singular wavelength range (i.e., with a singular color), the first, second and third lights may have wavelengths in other ranges, which will not be described in detail here.

Referring to FIG. 2, the cavity 219 has a position corresponding to positions of the top electrode 221 and the bottom electrode 205. In an embodiment, the cavity 219 has a width slightly greater than that of the bottom electrode 205. The cavity 219 has a size and shape corresponding to a size and shape of the movable electrode 212, so that the movable electrode 212 may move inside the cavity 219. In practice, the size and shape of the cavity may be specifically configured.

At least one second conducting plugs 215 may be formed in the ILD layer 227. The second conducting plugs 215 electrically couple the second control end 204 to the movable electrode 212, and are central symmetrical to the movable electrode 212. In an embodiment, there are two of the second conducting plugs 215. It should be noted that, only one of the second conducting plugs 215 is shown in FIG. 2 because of the projection. The relationship of the second conducting plugs 215, the movable electrode 212 and the cavity 219 will be further illustrated with reference to FIG. 3 hereinafter.

A first conducting plug 206 and a third conducting plug 222, respectively adapted for electrically coupling the first control end 202 to the bottom electrode 205, and electrically coupling the third control end 203 to the top electrode 221, may be formed in the ILD 227.

Further, the top electrode 221 is adapted for light dividing, i.e., dividing the light incident from the up space of the top electrode 221 into two parts. Therefore, the top electrode 221 may be a semi-transparent metal thin film. It is found that when the metal thin film has a semi-transparent characteristic and a thickness ranging from about 30 angstroms to about 300 angstroms, half of the incident light may be reflected and the other half may transmit through. It is also found that, the semi-transparent characteristic is mainly depended on the thickness of the metal thin film, basically has no relation with the wavelength of the incident light. In an embodiment, a metal thin film with a thickness ranging from about 30 angstroms to about 300 angstroms, which has the semi-transparent characteristic, is applied as the semi-transparent thin film, where the metal may be Ag, Al, Cu, Ti, Pt, Au, Ni, Co, or a combination thereof.

In an embodiment, the movable electrode 212 is made of metal, where the metal may be Ag, Al, Cu, Ti, Pt, Au, Ni, Co, or a combination thereof. The movable electrode 212 may have a thickness ranging from about 800 angstroms to about 10000 angstroms.

Further, as shown in FIG. 2, the first insulation layer 223 is a part of the ILD layer 227. Therefore, there is no need to form the first insulation layer 223 in an extra process. The second insulation layer 214 is formed on the light reflection surface of the movable electrode 212. The second insulation layer 214 is an insulation layer which is additionally formed, where the insulation layer may be silicon oxide, silicon oxynitride, silicon carbide, silicon nitride, or a combination thereof.

In an embodiment, the second insulation layer 214 may move with the movement of the movable electrode 212 in the cavity 219 along a direction perpendicularly to the light reflection surface. Since the movable electrode 212 is made of metal, unevenness may occur due to the metal layer manufacturing limits, and metal fatigue (metal failure, or losing flexibility) may be caused due to the repeated movement of the movable electrode 212 during operation. Forming the second insulation layer 214 on the movable electrode 212 may increase the rigidity of the movable electrode 212.

Therefore, when the movable electrode 212 shifts in the cavity 219, the second insulation layer 214 on the movable electrode 212 may also shift with the movable electrode 212. Besides, since the second insulation layer is completely transparent, lights may transmit through the second insulation layer 214, reach and be reflected on the surface of the movable electrode 212.

In other embodiments, an ideal rigidity of the movable electrode 212 may be obtained by optimizing the manufacturing process and selecting proper materials. Such that the second insulation layer 214 may not be formed on the movable electrode 212. On this occasion, the top insulation layer may only include the first insulation layer 223, that is to say, the movable electrode 212 and the top electrode 221 are electrically insulated merely by the first insulation layer 223. In an embodiment, the first insulation layer 223 may directly apply a part of the ILD layer. In other embodiments, insulation material may be additionally formed beneath the top electrode 221, applying material such as silicon oxide, silicon oxynitride, silicon carbide, silicon nitride, or a combination thereof.

In an embodiment, the thickness of the top insulation layer 224 is configured depended on the wavelength of the incident light to be modulated. In an embodiment, the thickness of the top insulation layer 224 needs to meet the requirement that: when the movable electrode 212 is at the first position, a distance between the top electrode 221 and the light reflection surface of the movable electrode 212 is an odd times of one fourth of the first light's wavelength. Since when the movable electrode 212 is at the first position, there is no gap but only the top insulation layer 224 between the top electrode 221 and the movable electrode 212, the sum of the thicknesses of the top electrode 221 and the top insulation layer 224 should be an odd times of one fourth of the first light's wavelength. When the thickness of the top insulation layer 224 is set, the thicknesses of the first and second insulation layers can be configured based on practical needs.

The bottom insulation layer 211 between the movable electrode 212 and the bottom electrode 205 is adapted for electrically insulating the movable electrode 212 from the bottom electrode 205. In an embodiment, the bottom insulation layer 211 may directly apply a part of the ILD layer, so that no additional process is necessary for forming the bottom insulation layer. In other embodiments, the bottom insulation layer 211 may be additionally formed, using material such as silicon oxide, silicon oxynitride, silicon carbide, silicon nitride, or a combination thereof.

Figure 3:
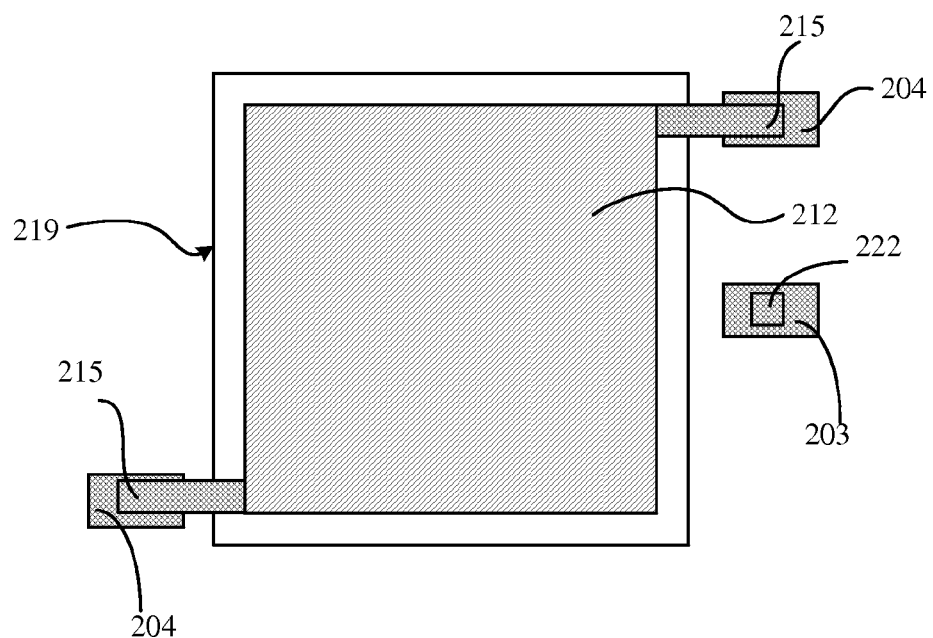
FIG. 3 is a schematic cross-sectional view of FIG. 2 along AA side.

To illustrate the structure of the light modulator pixel unit, please refer to FIG. 3, a schematic cross-sectional view of FIG. 2 along AA side. There are gaps disposed between the cavity walls of the cavity 219 and the movable electrode 212, so that the movable electrode 212 may shift therein. The movable electrode 212 is coupled to the second control end(s) 204 of the control circuit through the at least one second conducting plugs 215 which are central symmetrical to the movable electrode 212. The second conducting plugs 215 are adapted for electrically coupling the movable electrode 212 to the second control end 204, on the other hand, adapted for suspending the movable electrode 212 in the cavity 219, so as to hold the movable electrode 212's motion. There may be at least one of the second conducting plugs 215. In an embodiment, there are two of the second conducting plugs 215. The movable electrode 212 may accept the electrostatic force provided from the control circuit through the second conducting plugs, the second conducting plugs 212 may be arranged according to practical needs under the premise that the electrostatic force applied to the movable electrode 212 is balance.

The working principles of the light modulator pixel unit of the present disclosure will be illustrated in detail with reference of accompanying drawings. It should be noted that, the light modulator pixel unit may modulate the first light, the second light and the third light successively to generate a multicolor pixel. The first light is blue, the second light is green and the third light is red.

The first, second and third lights may come from three individual LED light resources, or are generated by processing a common white light using a filter lens and a color wheel, which is well known in the art and will not be described in detail here. The first, second and third lights are successively input into the modulator and maintained for a period. For illustration, a period of the first light being kept in the light modulator pixel unit 200 is called a first light period, a period of the second light being kept in the light modulator pixel unit 200 is called a second light period, and a period of the third light being kept in the light modulator pixel unit 200 is called a third light period.

Referring to FIG. 2, the control circuit is coupled to the bottom electrode 205, the movable electrode 212 and the top electrode 221 through the first control end 202, the second control end(s) 204 and the third control end 203.

The top electrode 221, the top insulation layer 224 and the movable electrode 212 constitute a first capacitance because the top insulation layer 224 is formed between the top electrode 221 and the movable electrode 212. If the control circuit applies electrical signals on the second control end(s) 204 and the third control end 203 (i.e., charging the first capacitance), a first electrostatic force may be generated between the top electrode 221 and the movable electrode 212. The first electrostatic force may force the movable electrode 212 (together with the second insulation layer 214 on the movable electrode 212) to shift toward the top electrode 221 (elastic deformation of the second conducting plugs 215 may occur because the second conducting plugs 214 are electrically coupled to the movable electrode 212). The movable electrode 212 may shift until the first and second insulation layers 223, 214 of the top insulation 224 contact with each other. Now the movable electrode 212 is at the first position, and a first predetermined distance is disposed between the light reflection surface of the movable electrode 212 and the top electrode 221. The first predetermined distance should equal to an odd times of one fourth of the first light's wavelength. When the movable electrode 212 is at the first position, if the first light is incident into the light modulator pixel unit 200, the first light may be divided into a first part and a second part by the top electrode 221. The first part may be reflected by the top electrode 221. The second part may transmit through the top electrode 221, transmit onto the light reflection surface of the movable electrode 212, be reflected by the light reflection surface, reach the top electrode 221, and transmit through the top electrode 221 and transmit upwards. Therefore, the first and second parts of the first light may have a phase difference of an odd times of a half of the first light's wavelength. As the first and second parts of the first light have the same frequency and the phase difference is an odd times of a half of the first light's wavelength, the first and second parts of the first light may interfere destructively. Therefore, the output of the light modulator pixel unit may be zero (complete dark).

If the control circuit doesn't apply the control signals to the second control end 204 and the third control end 203, or the control signals are withdrawn, the first electrostatic force generated between the top electrode 221 and the movable electrode 212 may disappear. Therefore, the second conducting plugs 215 may return to the status before the elastic deformation. As a result, the movable electrode 212 may shift to a relaxing status dragged by the second conducting plugs. At this time, the movable electrode 212 is at the second position. A second predetermined distance is disposed between the light reflection surface of the movable electrode 212 and the top electrode 221, and the second predetermined distance should equal to an odd times of one fourth of the second light's wavelength. When the movable electrode 212 is at the second position, if the second light is incident into the light modulator pixel unit 200, the second light may be divided into a first part and a second part by the top electrode 221. The first part may be reflected by the top electrode 221. The second part may transmit through the top electrode 221, transmit onto the light reflection surface of the movable electrode 212, be reflected by the light reflection surface, reach the top electrode 221, and transmit through the top electrode 221 and transmit upwards. Therefore, the first and second parts of the second light may have a phase difference of an odd times of a half of the second light's wavelength. As the first and second parts of the second light have the same frequency and the phase difference is an odd times of a half of the second light's wavelength, the first and second parts of the second light may interfere destructively. Therefore, the output of the light modulator pixel unit may be zero (complete dark).

The bottom electrode 205, the bottom insulation layer 211 and the movable electrode 212 constitute a second capacitance because the bottom insulation layer 211 is disposed between the bottom electrode 205 and the movable electrode 212. If the control circuit applies electrical signals on the second control end 204 and the first control end 202 (i.e., charging the second capacitance), a second electrostatic force may be generated between the bottom electrode 205 and the movable electrode 212. The second electrostatic force may force the movable electrode 212 to shift toward the bottom electrode 205 (elastic deformation of the second conducting plugs 215 may occur because the second conducting plugs 214 are electrically coupled to the movable electrode 212). The movable electrode 212 may shift until it is in contact with the bottom of the cavity 219. Now the movable electrode 212 is at the third position, and a third predetermined distance is disposed between the light reflection surface of the movable electrode 212 and the top electrode 221. The third predetermined distance should equal to an odd times of one fourth of the third light's wavelength. When the movable electrode 212 is at the third position, if the third light is incident into the light modulator pixel unit 200, the third light may be divided into a first part and a second part by the top electrode 221. The first part may be reflected by the top electrode 221. The second part may transmit through the top electrode 221, transmit onto the light reflection surface of the movable electrode 212, be reflected by the light reflection surface, reach the top electrode 221, and transmit through the top electrode 221 and transmit upwards. Therefore, the first and second parts of the third light may have a phase difference of an odd times of a half of the third light's wavelength. As the first and second parts of the third light have the same frequency and the phase difference is an odd times of a half of the third light's wavelength, the first and second parts of the third light may interfere destructively. Therefore, the output of the light modulator pixel unit may be zero (complete dark).

Summing up the above, when the reflection surface of the movable electrode 212 and the top electrode 221 are spaced with a distance equaling to an odd times of one fourth of the first light's wavelength, if the light modulator pixel unit 200 is input with the first light, the output thereof may be complete dark; if the input if the light modulator pixel unit 200 is the second light or the third light, the light modulator pixel unit 200 may be a mirror of the second and third lights, i.e., the light modulator pixel unit 200 may be input with the second light, reflect and output the second light, or similarly, be input with the third light, reflect and output the third light.

Similarly, when the reflection surface of the movable electrode 212 and the top electrode 221 are spaced with a distance equaling to an odd times of one fourth of the second light's wavelength, if the light modulator pixel unit 200 is input with the second light, the output thereof may be complete dark; if the input if the light modulator pixel unit 200 is the first light or the third light, the light modulator pixel unit 200 may be a mirror of the first and third lights, i.e., the light modulator pixel unit 200 may be input with the first light, reflect and output the first light, or similarly, be input with the third light, reflect and output the third light.

When the reflection surface of the movable electrode 212 and the top electrode 221 are spaced with a distance equaling to an odd times of one fourth of the third light's wavelength, if the light modulator pixel unit 200 is input with the third light, the output thereof may be complete dark; the light modulator pixel unit 200 may be a mirror of the first and second lights, i.e., the light modulator pixel unit 200 may be input with the first light, reflect and output the first light, or similarly, be input with the second light, reflect and output the second light.

The light modulator pixel unit provided by embodiments of the present disclosure can control the period when the output of the pixel unit is complete dark in the first light period corresponding to the first light by controlling the distance between the reflection surface of the movable electrode and the top electrode. Therefore, the grayscale of the first light output by the light modulator pixel unit may be adjusted. Similarly, the grayscales of the second and third lights output by the light modulator pixel unit may be adjusted. When the first, second and third lights, with certain grayscales, are successively output from the light modulator pixel unit and reach an observer's visual system, the first, second and third lights may compose therein and thereby generating a multi-color pixel. It should be noted that the time intervals when outputting the first, second and third light by the light modulator pixel unit should be small enough to ensure that the observer may feel the first, second and third lights being input into the visual system simultaneously, which may be similar to the conventional techniques and will not be described in detail here. The first, second and third lights output by the light modulator pixel unit directly compose in the observer's visual system, without being filtered or losing light power. Therefore, the usage of light may be increased, which is beneficial for reducing the power consumption of a single light modulator pixel unit. Therefore, the light modulator pixel unit may be more applicable in micro display systems.

In embodiments of the present disclosure, applying electrical signals to the bottom electrode, the movable electrode and the top electrode may be performed using pulse width modulation (PWM). Pulse signals with high electrical level may be applied to charge the bottom electrode and the movable electrode, or charge the movable electrode and the top electrode, thereby controlling the movable electrode to move. These are well known in the art and will not be described in detail here.

Figure 4:
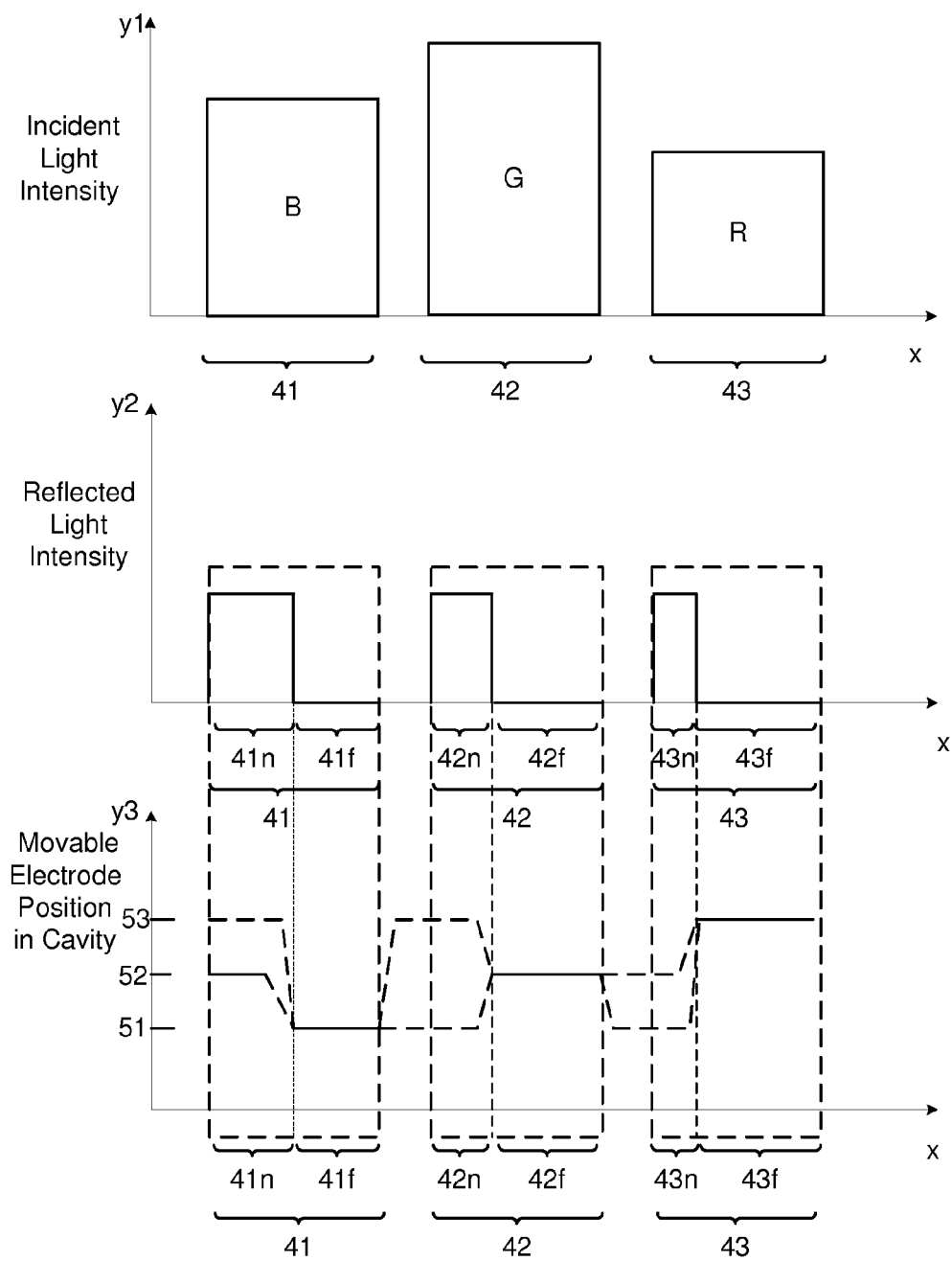
FIG. 4 is a schematic sequential chart illustrating light input and light output of a light modulator pixel unit according to one embodiment of the present disclosure.

FIG. 4 is a schematic sequential chart illustrating light input and light output of a light modulator pixel unit according to one embodiment of the present disclosure. In FIG. 4, an x axis is the time axis, and a y1 axis represents the intensity of the incident light. In an embodiment, a red light R, a green light G and a blue light B are successively input into the light modulator pixel unit. Among the incident lights, the green light G has the largest intensity, so that an ideal display effect may be obtained. For illustration, the period of inputting the blue light B is called a first light period 41, the period of inputting the green light G is called a second light period 42, and the period of inputting the red light R is called a third light period 43.

In FIG. 4, a y2 axis represents the intensity of the light reflected by the light modulator pixel unit, a y3 axis represents the position of the movable electrode in the cavity. Taking the first light as an example, the first light period 41 further includes a first opening period 41*n* and a first closing period 41*f*.

During the first opening period 41*n*, the movable electrode is at a second position 52 or a third position 53 in the cavity, and the light modulator pixel unit outputs the first light. During the first closing period 41*f*, the movable electrode is at a first position 51, and the light modulator pixel unit outputs zero. The grayscale of the first light output by the light modulator pixel unit may be adjusted by controlling the ratio of the first groove period 41*n* to the first closing period 41*f* within the first light period 41. The operation of the light modulator pixel unit during the second light period 42 and the third light period 43 is similar to that in the first light period 41, which will not be described in detail here.

It should be noted that, in embodiments of the present disclosure, sizes of the components in the ILD layer, the bottom electrode, the movable electrode, the top electrode and the cavity need to be specifically configured based on the lights to be modulated. The top electrode may have a thickness ranging from about 30 angstroms to about 300 angstroms, and the movable electrode may have a thickness ranging about 800 angstroms to about 10000 angstroms. The thickness of the top insulation layer should meet the requirement that, when the movable electrode is at the first position, the distance between the light reflection surface and the top electrode equals to an odd times of one fourth of the first light's wavelength. When the movable electrode is at the relaxing status (without the electrostatic force), the movable electrode is at the second position, the distance between the light reflection surface and the top electrode equals to an odd times of one fourth of the second light's wavelength. The depth of the cavity should meet the requirement that, when the movable electrode is at the third position, the distance between the light reflection surface and the top electrode equals to an odd times of one fourth of the third light's wavelength. Those skilled in the art may calculate the distances based on the wavelength of the lights to be modulated.

Figure 5:
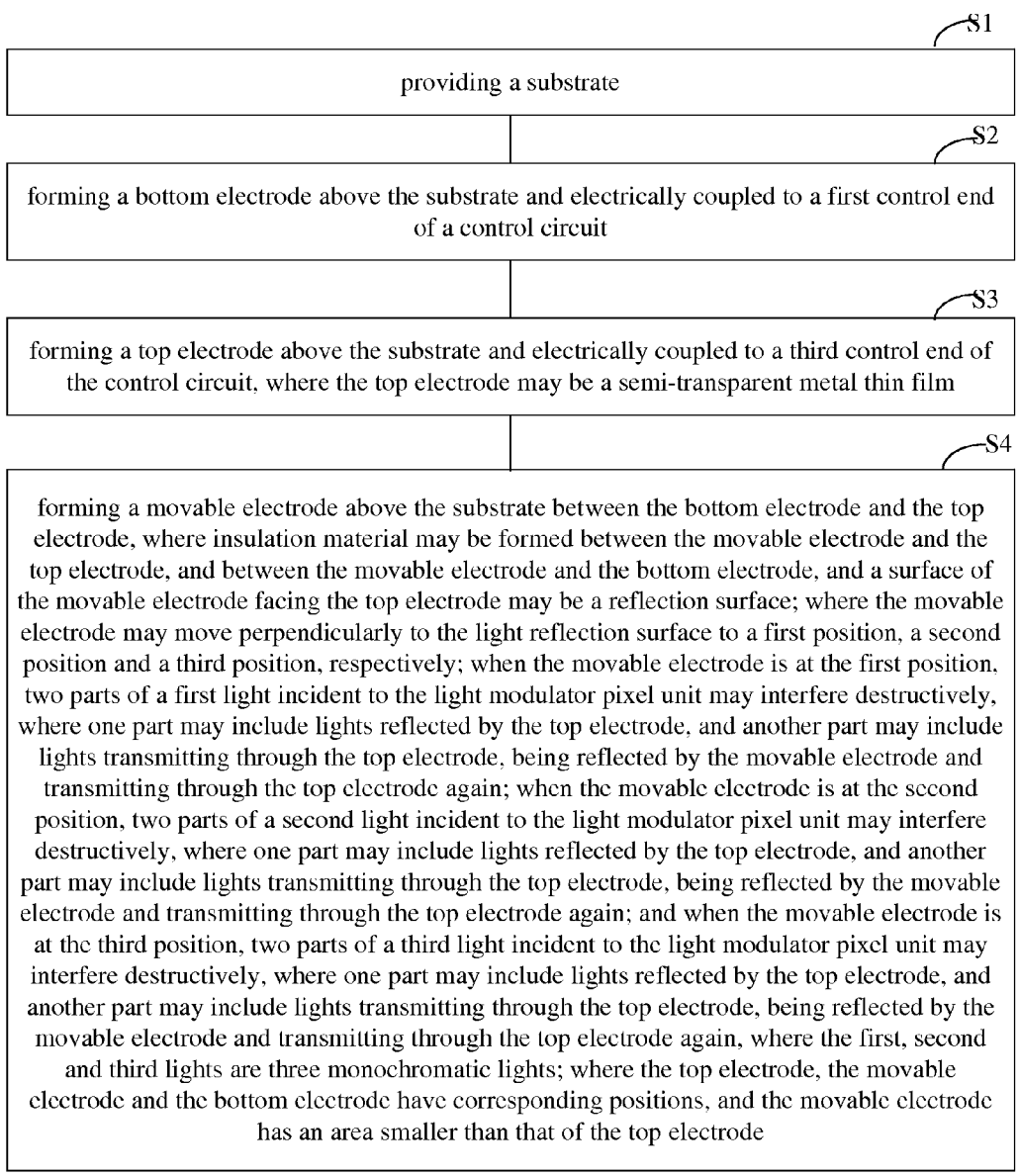
FIG. 5 is schematic flow chart illustrating a method for forming a light modulator pixel unit according to another embodiment of the present disclosure.

Embodiments of the present disclosure further provide a method for forming a light modulator pixel unit. Referring to FIG. 5, a schematic flow chart illustrating a method for forming a light modulator pixel unit according to another embodiment of the present disclosure, the method includes:

Step S1, providing a substrate;

Step S2, forming a bottom electrode above the substrate and electrically coupled to a first control end of a control circuit;

Step S3, forming a top electrode above the substrate and electrically coupled to a third control end of the control circuit, where the top electrode may be a semi-transparent metal thin film; and Step S4, forming a movable electrode above the substrate between the bottom electrode and the top electrode, where insulation material may be formed between the movable electrode and the top electrode, and between the movable electrode and the bottom electrode, and a surface of the movable electrode facing the top electrode may be a reflection surface; where the movable electrode may move perpendicularly to the light reflection surface to a first position, a second position and a third position, respectively; when the movable electrode is at the first position, two parts of a first light incident to the light modulator pixel unit may interfere destructively, where one part may include lights reflected by the top electrode, and another part may include lights transmitting through the top electrode, being reflected by the movable electrode and transmitting through the top electrode again; when the movable electrode is at the second position, two parts of a second light incident to the light modulator pixel unit may interfere destructively, where one part may include lights reflected by the top electrode, and another part may include lights transmitting through the top electrode, being reflected by the movable electrode and transmitting through the top electrode again; and when the movable electrode is at the third position, two parts of a third light incident to the light modulator pixel unit may interfere destructively, where one part may include lights reflected by the top electrode, and another part may include lights transmitting through the top electrode, being reflected by the movable electrode and transmitting through the top electrode again, where the first, second and third lights are three monochromatic lights; where the top electrode, the movable electrode and the bottom electrode have corresponding positions, and the movable electrode has an area smaller than that of the top electrode.

The movable electrode is electrically coupled to a second control end of the control circuit.

In an embodiment, the method may further include:

forming an interlayer dielectric (ILD) layer on the substrate; and forming a cavity in the ILD layer, where the cavity has cavity walls, and includes a first portion at the lower part of the cavity and a second portion at the upper part of the cavity;

where the bottom electrode is formed in the ILD layer between the first portion and the substrate;

where the top electrode is formed in the ILD layer above the second portion; and where the movable electrode is formed in the cavity and spaced away from the cavity walls, so as to hold the movable electrode's motion In an embodiment, the substrate may be a semiconductor substrate, including Si, Ge, GaAs, or the like, or may be a glass substrate. The following description will employ the substrate being a semiconductor substrate as an example for illustrating.

The control circuit is adapted for applying control signals to components in the semiconductor substrate. The control circuit may be formed in the semiconductor substrate or in another semiconductor substrate. Preferably, the control circuit is formed in the semiconductor substrate, so that the chip area may be saved and the unit may be more applicable in micro display systems.

Hereinafter, embodiments of the present disclosure will be described in detail, taking the control circuit formed in the semiconductor substrate as an example, with reference to accompanying drawings. Please refer to FIGS. 6 to 13, schematic cross-sectional views of intermediate structures illustrating a process for forming a light modulator pixel unit according to an embodiment of the present disclosure.

Figure 6:
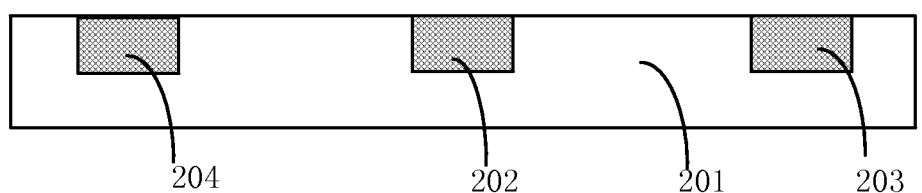
FIGS. 6 to 13 are schematic cross-sectional views of intermediate structures illustrating a process for forming a light modulator pixel unit according to an embodiment of the present disclosure.

As shown in FIG. 6, firstly, a substrate 201 is provided. The substrate 201 is a semiconductor substrate. In an embodiment, a control circuit is formed in the substrate 201, including a first control end 202, a second control end 204 and a third control end 203 adapted for applying electrical signals to a bottom electrode, a movable electrode and a top electrode formed subsequently. The control ends are arranged corresponding to the bottom electrode, the movable electrode and the top electrode, respectively, configured based on practical needs. In other embodiments, the control circuit may be formed in another semiconductor substrate, electrically coupled to the bottom electrode, the movable electrode and the top electrode subsequently formed in the substrate 201 through conducting structures.

Figure 7:
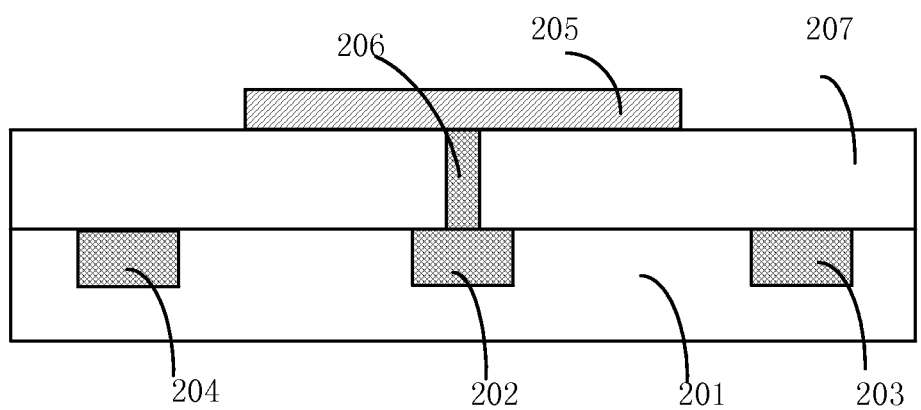

Thereafter, referring to FIG. 7, a first ILD layer 207 is formed on the substrate 201. A bottom electrode 205 is formed on a surface of the first ILD layer 207. A first conducting plug 206 is formed beneath the bottom electrode 205. The first conducting plug 206 electrically couples the bottom electrode 205 and a first control end 202. The first ILD layer 207 may include a material selected from silicon oxide, silicon oxynitride, silicon carbide, silicon nitride and a combination thereof. The bottom electrode 205 is made of metal which may be Ag, Al, Cu, Ti, Pt, Au, Ni, Co, or a combination thereof.

Figure 8:
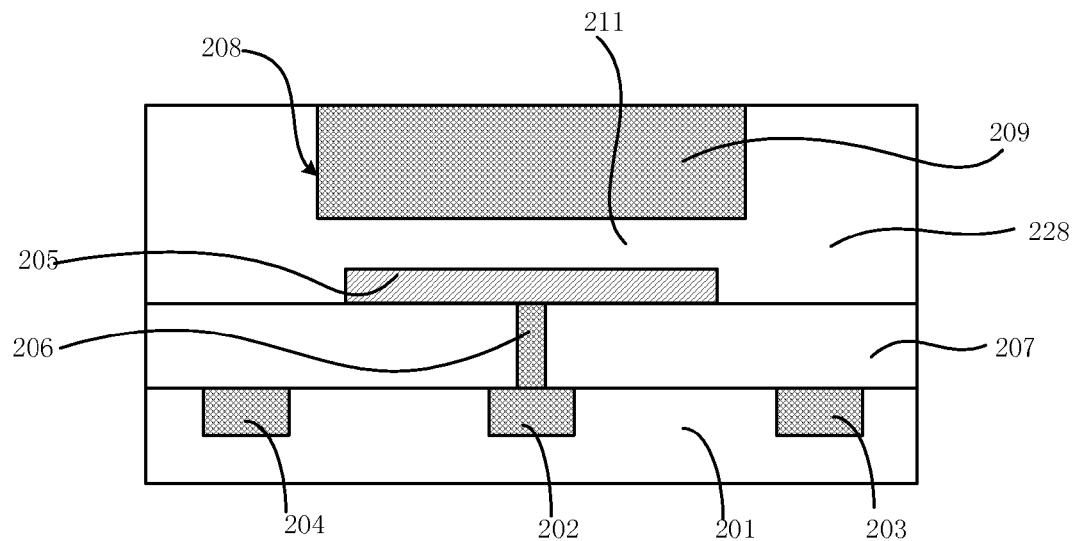

Referring to FIG. 8, a second ILD layer 228 is formed on the first ILD layer 207. The second ILD layer 228 includes a bottom insulation layer 211. The second ILD layer 228207 may include a material selected from silicon oxide, silicon oxynitride, silicon carbide, silicon nitride and a combination thereof. The bottom insulation layer 211 is formed in the second ILD layer 228 on the bottom electrode 205, adapted for electrically insulating the bottom electrode 205 from the movable electrode formed subsequently. The bottom insulation layer 211 may be made of silicon oxide, silicon oxynitride, silicon carbide, silicon nitride or a combination thereof. In a preferable embodiment, the bottom insulation layer 211 and the second ILD layer 228 include the same material. Therefore, the bottom insulation layer 211 may be formed with the second ILD layer 228, simultaneously, which may save processing steps. The bottom insulation layer 211 may be formed in an additional process, and the material thereof may be silicon oxide, silicon oxynitride, silicon carbide, silicon nitride or a combination thereof.

Thereafter, referring still to FIG. 8, the second ILD layer 228 is etched to form a first groove 208 therein and expose the bottom insulation layer 211. The first groove 208 has a position corresponding to that of the bottom electrode 205. The first groove 208 is adapted for forming a part of a cavity formed later, providing a space for the movable electrode to move.

Thereafter, referring still to FIG. 8, a first sacrificial layer 209 is filled into the first groove 208, covering the bottom insulation layer 211.

The first sacrificial layer 209, adapted for supporting the movable electrode when forming the movable electrode subsequently, will be removed at last. Therefore, the first sacrificial layer 209 may include a material which may be easily removed. In other words, preferably, the first sacrificial layer 209 is selected with a material having a relatively high etching selectivity regarding to that of the second ILD layer 228 and the movable electrode formed subsequently, such that substances which are not desired to be removed may not be affected when removing the first sacrificial layer 209. For example, the first sacrificial layer 209 may include carbon, germanium or polyamide. In an embodiment, the first sacrificial layer 209 is made of amorphous carbon, which may be formed using a plasma enhanced chemical vapor deposition (PECVD) process. The processing temperature may be preferably selected within a range from about 350° C. to about 450° C. to guarantee the quality of the amorphous carbon thin film.

In embodiments of the present disclosure, the amorphous carbon is filled into the first groove 208 with a PECVD process which is compatible with CMOS processes. Additionally, the amorphous carbon formed with PECVD may have a compact structure which may be oxidated to carbon dioxide using an ashing process. Therefore, the first sacrificial layer may be easily removed without affecting other components. It should be noted that, after filling the first sacrificial layer 209 into the first groove 208 using the PECVD process, a surface flatten process should be performed to ensure that metal may be uniformly deposited when forming the movable electrode subsequently.

Figure 9:
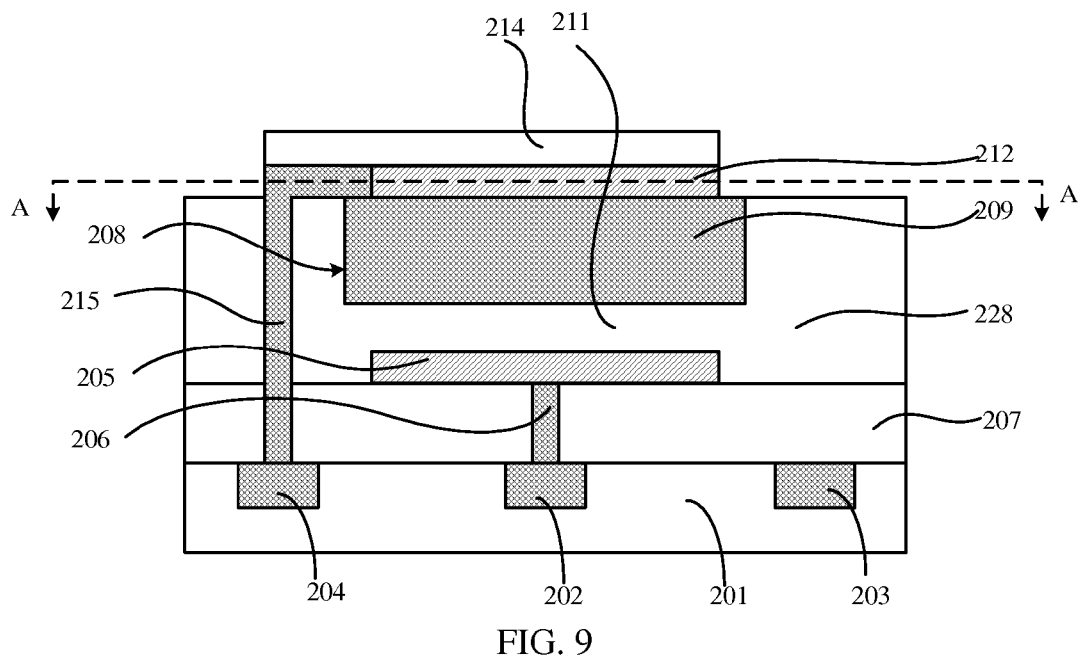

Referring to FIG. 9, a movable electrode 212 is formed on the second ILD layer 228 and the first sacrificial layer 209. The movable electrode 212 is electrically insulated from the bottom electrode 205. The movable electrode 212 has a position corresponding to that of the bottom electrode 205. The movable electrode 212 is electrically coupled to the second control end 204 through at least one second conducting plugs 215. In some embodiment, before the formation of the movable electrode 212, at least two of the second conducting plugs need to be formed corresponding to the positions of the second control end(s) 204 and the movable electrode 212. The second conducting plugs 215 are central symmetrical to the movable electrode 212, penetrate through the second ILD layer 228 and the first ILD layer 207. The movable electrode 212 has a light reflection surface, adapted for reflecting lights, on a side apart from the bottom electrode 205.

Figure 14:
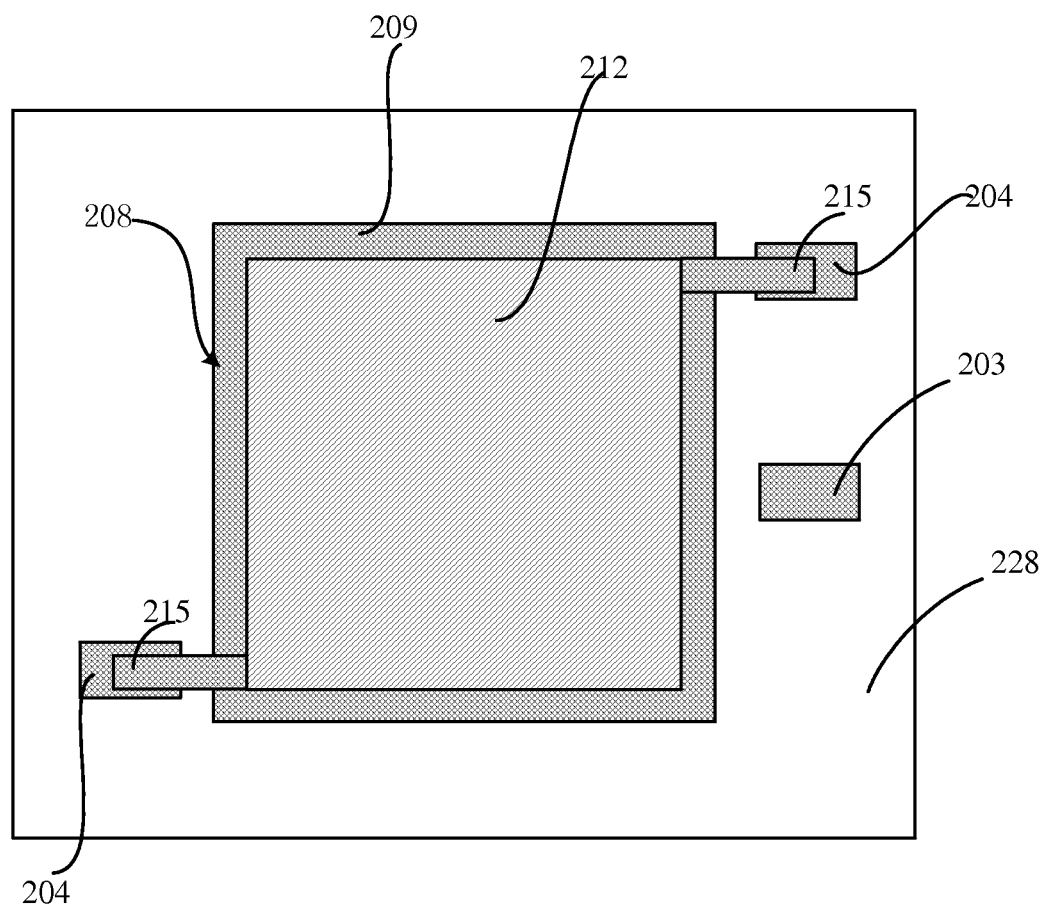
FIG. 14 is a schematic cross-sectional view of FIG. 9 along AA side.

Referring to FIG. 14, a schematic cross-sectional view of FIG. 9 along AA side, the first groove 208 is formed in the second ILD layer 228 and filled with the first sacrificial layer 209. The movable electrode 212 is electrically coupled to the second control end(s) 204 through the second conducting plugs 215 which are central symmetrical to the movable electrode 212. The second conducting plugs 215, on the one hand, are adapted for electrically coupling the movable electrode 212, one the other hand, for suspending the movable electrode 212 in the cavity formed subsequently and dragging the movable electrode 212 to move. Since the movable electrode 212 may shift under the effect of an electrostatic force generated from the control circuit, configuring the second conducting plugs 215 as central symmetrical to the movable electrode 212 may ensure that the movable electrode 212 is subject to a balanced electrostatic force. Under the premise that the movable electrode 212 is subject to a balanced electrostatic force, there may be three or more than three of the second conducting plugs 215. Arrangement of the second conducting plugs may be configured according to practical needs, which will not be described in detail here.

In an embodiment, the first groove 208 and a part of the movable electrode 212 formed therein may be rectangular. In other embodiments, the first groove 208 and the part of the movable electrode 212 formed therein may have other shapes, such as a circle.

The movable electrode 212 may be made of metal, with a thickness ranging from about 800 angstroms to about 10000 angstroms. The metal may be Ag, Al, Cu, Ti, Pt, Au, Ni, Co or a combination thereof.

Referring to FIG. 9, since the movable electrode 212 is made of metal, in order to avoid the unevenness of the metal surface result from the manufacturing limits or metal fatigue caused by repeatedly moving the movable electrode, in a preferable embodiment, a second insulation layer 214 may be formed to overlay the movable electrode 212 after the formation thereof. The second insulation layer 214 may have a material selected from transparent insulation materials with certain rigidity, so as to avoid affecting the reflection effect of the light reflection surface and increasing the rigidity of the movable electrode 212. The second insulation layer 214 and a first insulation layer formed subsequently together constitute a top insulation layer adapted for electrically insulating the movable electrode 212 and a top insulation electrode formed subsequently.

Figure 10:
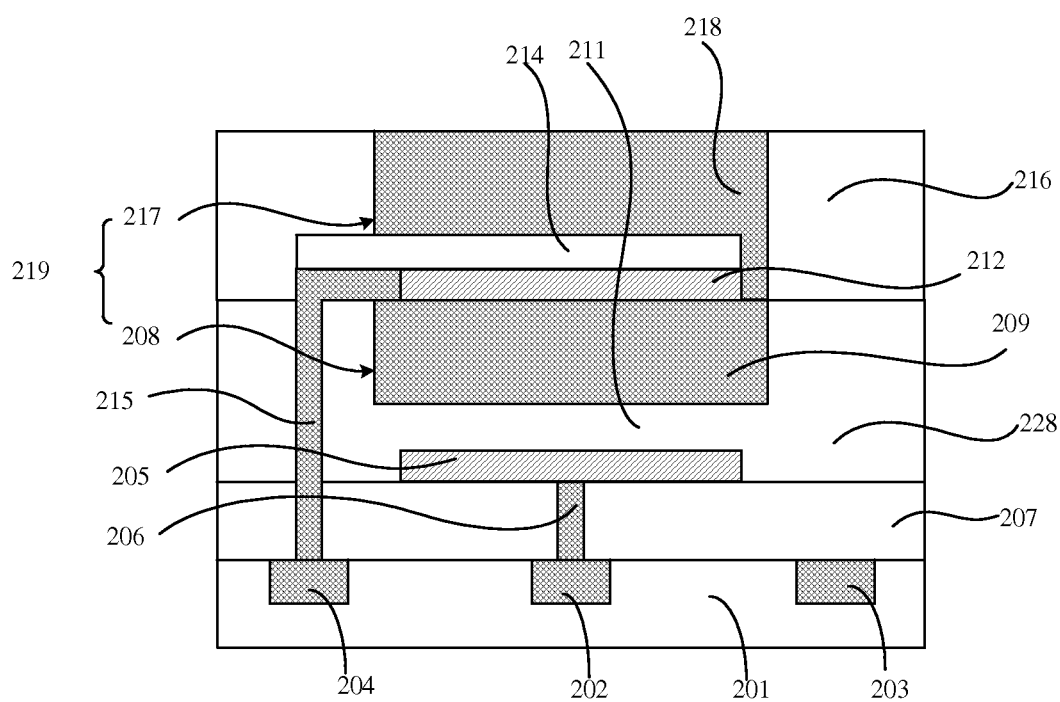

Referring to FIG. 10, a third ILD layer 216 is formed on the second ILD layer 228 and the movable electrode 212. A second groove 217 is formed in the third ILD layer 216 with a position corresponding to that of the first groove 208. The second groove 217 is adapted for forming a second part of the cavity.

Thereafter, a second sacrificial layer 218 is filled into the second groove 217, adapted for supporting the top electrode formed subsequently. At last, the second sacrificial layer 218 will be removed together the first sacrificial layer 209 in the first groove 208, so that the first and second grooves 208, 217 may constitute the cavity. The second sacrificial layer 218 may include a material which may be easily removed. In other words, preferably, the second sacrificial layer 218 is selected with a material having a relatively high etching selectivity regarding to that of the third ILD layer 216 and the movable electrode 212. Therefore, substances which are not desired to be removed may not be affected when removing the second sacrificial layer 218. For example, the second sacrificial layer 218 may include carbon, germanium or polyamide. In an embodiment, the first and second sacrificial layers 209, 218 include the same material. Formation of the second sacrificial layer 218 may be performed with reference to the formation of the first sacrificial layer 209. The first and second sacrificial layers 209, 218 are removed in a same process.

Figure 11:
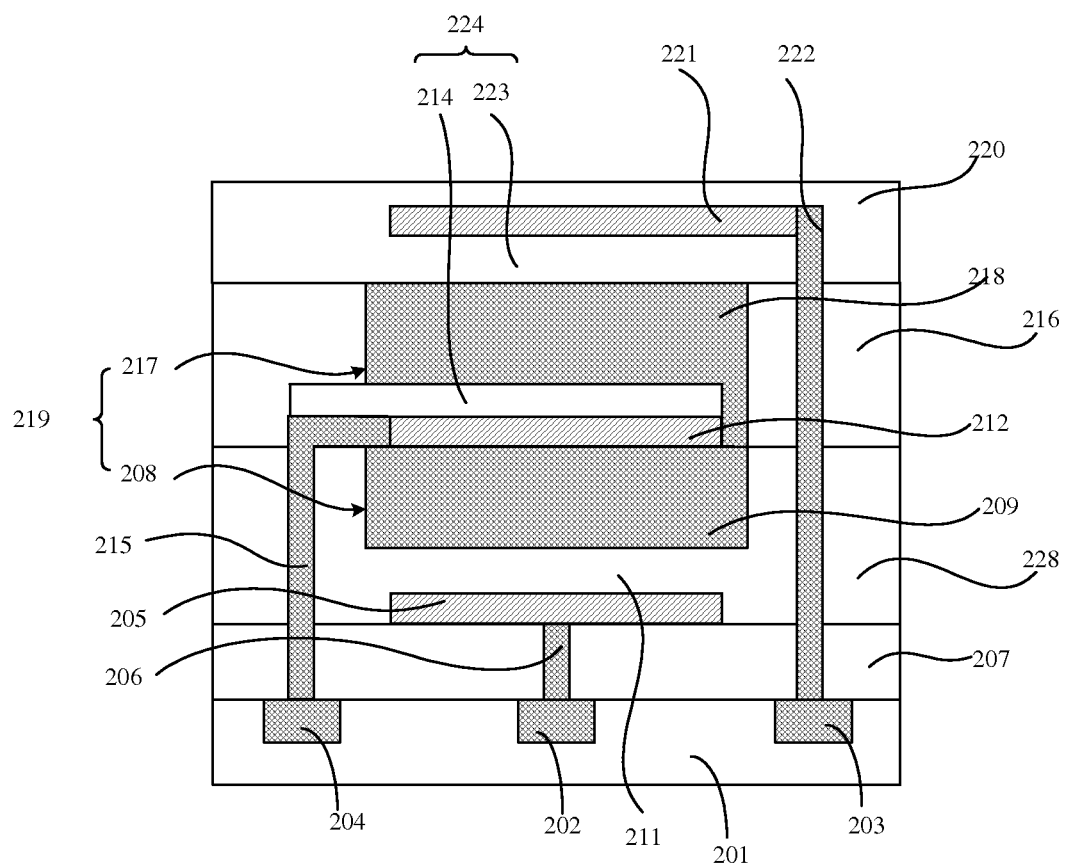

Thereafter, referring to FIG. 11, a fourth ILD layer 220 is formed on the third ILD layer 216, with a first insulation layer 223 and a top electrode 221 formed therein. The first insulation layer 223 is on the second groove 217. The top electrode 221 is on the first insulation layer 223. On the one hand, the first insulation layer 223 is adapted for sealing the first and second grooves 208, 217 to form a cavity after the second sacrificial layer 218 is removed, on the other hand, the first insulation layer 223 and the second insulation layer 214 together constitute a top insulation layer 224. The first insulation layer 223 may have a material selected from silicon oxide, silicon oxynitride, silicon carbide, silicon nitride and a combination thereof. In a preferable embodiment, the first insulation layer 223 and the fourth ILD layer 220 may have the same material, so as to be formed in a same process, thereby saving processing steps. In another embodiment, the first insulation layer 223 may be formed using an additional process, with a material selected from silicon oxide, silicon oxynitride, silicon carbide, silicon nitride and a combination thereof.

The electrode 221 has a position corresponding to that of the movable electrode 212 and one end electrically coupled to a third conducting plug 222. Before the formation of the top electrode 221, a metallization process is performed to form the third conducting plug 222 at a position corresponding to a third control end 203 and the top electrode 221 to be formed. The third conducting plug 222 penetrates through a part of the fourth ILD layer 220, the third ILD layer 216, the second ILD layer 228 and the first ILD layer 207, and couples the top electrode 221 and the third control end 203.

The top electrode 221 is adapted for light dividing (i.e., reflecting half of the incident light and allowing the other half to pass through). The top electrode 221 may be a semi-transparent metal thin film. In an embodiment, the top electrode 221 is made of metal and has a thickness ranging from about 30 angstroms to about 300 angstroms. Within the thickness range, the top electrode 221 may be semi-transparent.

The first insulation layer 223 and the second insulation layer 214 together constitute the top insulation layer 224. The top insulation layer 224 is adapted for electrically insulating the movable electrode 212 and the top electrode 221 when the movable electrode 212 moves towards the top electrode 221, besides, determining a first predetermined distance between the movable electrode 212 and the top electrode 221 (where the first predetermined distance equals to one fourth of the first light's wavelength). In practice, the top insulation layer 224 may have a thickness equaling to the first predetermined distance, under such premise, the thicknesses of the first insulation layer 223 and the second insulation layer 224 may be configured according to practical needs. If the movable electrode 212 has an acceptable rigidity it self, the thickness of the first insulation layer 223 may be zero.

Figure 12:
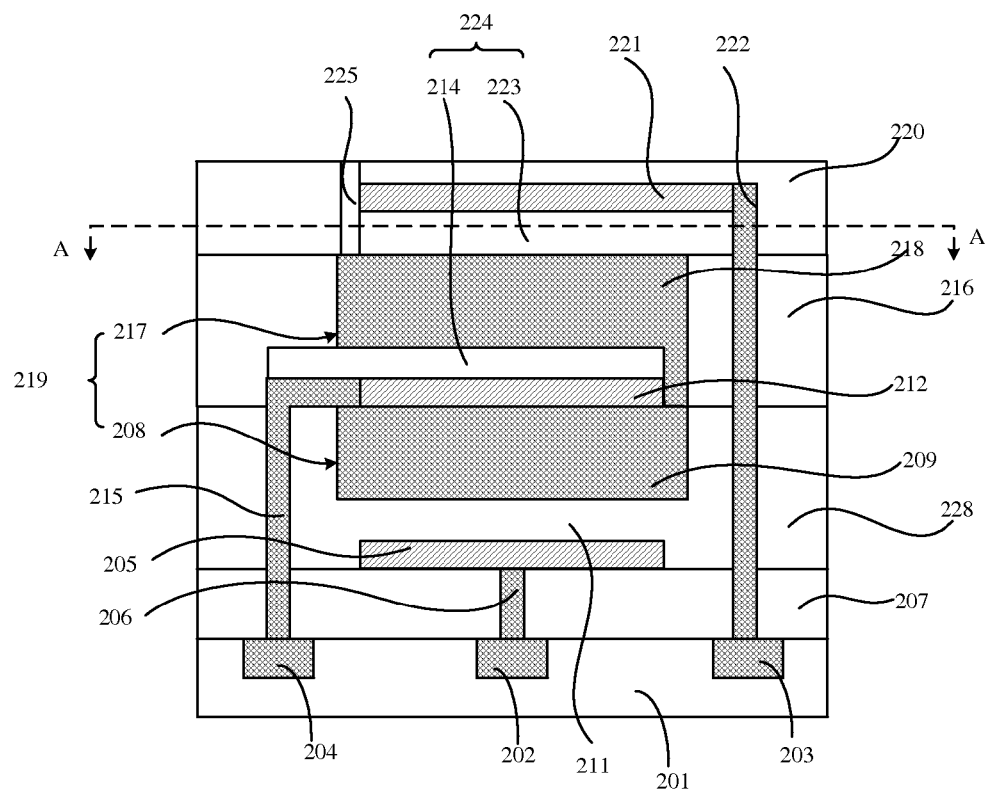

Thereafter, referring to FIG. 12, the fourth ILD layer 220 is etched to form a via 225 to expose the second sacrificial layer 217. The via 225, exposing the second sacrificial layer 218, is adapted for letting in gas or liquid to remove the first sacrificial layer 209 and the second sacrificial layer 218. The depth-to-width ratio of the via 225 should not be too large, or else a subsequent deposition process may not block the via. The depth-to-width ratio should not be too small, or else removing the first sacrificial layer 209 and the second sacrificial layer 218 may be influenced. The depth-to-width ratio may be configured according to the material and thickness of the sacrificial layers to be removed. Those skilled in the art may have an option to configure the ratio based on the above described principles, and obtain a preferable range through limited tests. In an embodiment, the via 225 has a depth-to-width ratio ranging from about 0.3 to about 1.5. Taking the first sacrificial layer 209 and the second sacrificial layer 218 being made of amorphous carbon as an example, in an embodiment, an ashing process (which is a dry etch process) is applied to remove the amorphous carbon. Specifically, oxygen ions are supplied into the via at a high temperature (ranging from about 100□ to about 350° C.). The oxygen ions are used to blasting the amorphous carbon and oxidate the amorphous carbon into gaseous oxidation. Therefore, the sacrificial layers may be removed without a damage caused for other components.

Figure 13:
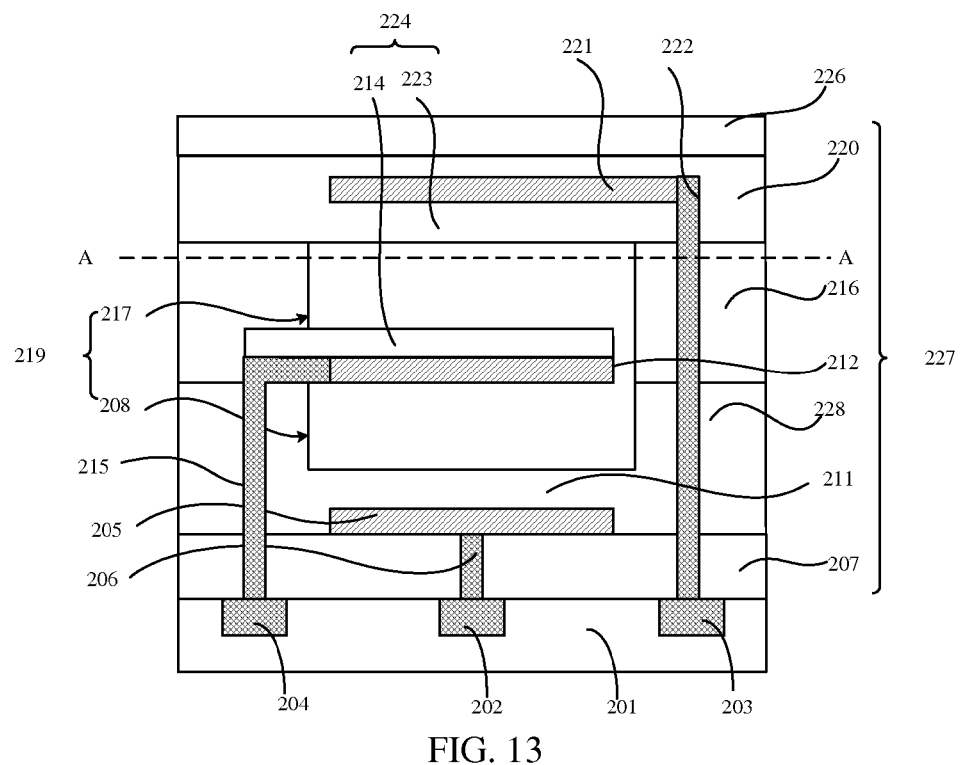

Thereafter, referring to FIG. 13, the first sacrificial layer (not shown in FIG. 13) in the first groove 208 and the second sacrificial layer (not shown in FIG. 13) in the second groove 217 are removed, and a covering layer 226 is formed on the fourth ILD layer to cover and seal the via (not shown in FIG. 13). After the first sacrificial layer in the first groove 208 and the second sacrificial layer in the second groove 217 are removed, the first groove 208 and the second groove 217 constitute a cavity 219, where the first groove 208 becomes a first portion of the cavity 219 and the second groove 217 becomes a second portion of the cavity 219. The movable electrode 212 is disposed in the cavity 212.

The covering layer 226 is adapted for sealing the via, a material thereof may be silicon oxide, silicon oxynitride, silicon carbide, silicon nitride, or a combination thereof. In a preferable embodiment, the covering layer 226, the fourth ILD layer 220, the third ILD layer 216, the second ILD layer 228 and the first ILD layer 207 have the same material and together constitute an ILD layer 227, so as to provide insulation between the electrodes and conducting plugs.

Summing up the above, embodiments of the present disclosure provide a light modulator pixel unit and a method for forming a light modulator pixel unit. The light modulator pixel unit can control monochromatic lights of three special wavelengths by time division, and enable color control and gray control. The unit is applicable in micro display systems and panel display systems. Further, the light modulator pixel unit may use the lights more efficiently, so that the power consumption of a single pixel unit may be reduced, so does the overall power consumption of a light modulator formed with the pixel units.

The invention is disclosed, but not limited, by preferred embodiments as above. Based on the disclosure of the invention, those skilled in the art can make any variation and modification without departing from the scope of the invention. Therefore, any simple modification, variation and polishing based on the embodiments described herein is within the scope of the present invention.

What is claimed is:

1. A light modulator pixel unit, comprising:
   a substrate;
   a bottom electrode, formed above the substrate and electrically coupled to a first control end of a control circuit;
   a top electrode, formed above the substrate and electrically coupled to a third control end of the control circuit, where the top electrode is a semi-transparent metal thin film;
   a movable electrode, formed between the bottom electrode and the top electrode, and electrically coupled to a second control end of the control circuit, where a surface of the movable electrode facing the top electrode is a light reflection surface, the movable electrode is able to move perpendicularly to the light reflection surface, and there formed insulation material between the movable electrode and the top electrode, and between the movable electrode and the bottom electrode; and
   an insulation layer formed on the movable electrode, wherein the insulation layer comprises a transparent insulation material having a predetermined rigidity;
   where the top electrode, the movable electrode and the bottom electrode have corresponding positions, the movable electrode has an area smaller than that of the top electrode, under the control of the control circuit, the movable electrode is able to shift to a first position, a second position and a third position respectively; when the movable electrode is at the first position, two parts of a first light incident to the light modulator pixel unit interfere destructively, where one part comprises lights reflected by the top electrode, and the other part comprises lights exiting from the top electrode, after transmitting through the to electrode and being reflected by the movable electrode; when the movable electrode is at the second position, two parts of a second light incident to the light modulator pixel unit interfere destructively, where one part comprises lights reflected by the top electrode, and the other part comprises lights exiting from the top electrode, after transmitting through the to electrode and being reflected by the movable electrode; and when the movable electrode is at the third position, two parts of a third light incident to the light modulator pixel unit interfere destructively, where one part comprises lights reflected by the top electrode, and the other part comprises lights exiting from the top electrode, after transmitting through the to electrode and being reflected by the movable electrode, where the first, second and third lights are three monochromatic lights.

2. The light modulator pixel unit according to claim 1, wherein the control circuit is formed in the substrate or formed in another substrate.

3. The light modulator pixel unit according to claim 1, wherein the bottom electrode is electrically insulated from the substrate, and the top electrode is electrically insulated from the substrate.

4. The light modulator pixel unit according to claim 1, wherein the top electrode comprises metal, and has a thickness ranging from about 30 angstroms to about 300 angstroms, and the metal is Ag, Al, Cu, Ti, Pt, Au, Ni, Co, or a combination thereof.

5. The light modulator pixel unit according to claim 1, wherein the movable electrode comprises metal, and has a thickness ranging from about 800 angstroms to about 10000 angstroms, and the metal is Ag, Al, Cu, Ti, Pt, Au, Ni, Co, or a combination thereof.

6. The light modulator pixel unit according to claim 1, wherein a sum of thicknesses of the top electrode, the insulation material between the movable electrode and the top electrode, and the insulation layer, is an odd multiple of one fourth of a wavelength of the first light.

7. The light modulator pixel unit according to claim 1, wherein the first light, the second light and the third light are successively input into the light modulator pixel unit and maintained for a period.

8. The light modulator pixel unit according to claim 1, further comprising:
   an interlayer dielectric (ILD) layer, formed on the substrate;
   a cavity, formed in the ILD layer, where the cavity has cavity walls, and comprises a first portion at a lower part of the cavity and a second portion at an upper part of the cavity;
   where the bottom electrode is formed in the ILD layer between the first portion and the substrate;
   where the top electrode is formed in the ILD layer above the second portion; and
   the movable electrode is formed in the cavity and spaced away from the cavity walls, so as to hold motion of the movable electrode.

9. The light modulator pixel unit according to claim 8, wherein the insulation material between the movable electrode and the top electrode, and between the movable electrode and the bottom electrode, applies the ILD layer or is formed additionally.

10. The light modulator pixel unit according to claim 8, wherein the ILD layer or an additionally formed insulation material is silicon oxide, silicon oxynitride, silicon carbide, silicon nitride, or a combination thereof.

11. The light modulator pixel unit according to claim 8, wherein at least one second conducting plugs are formed inside the ILD layer, the at least one second conducting plugs electrically couple the second control end to the movable electrode, and the at least one second conducting plugs are central symmetrical with the movable electrode.

12. A method for forming a light modulator pixel unit, comprising;
   providing a substrate;
   forming a bottom electrode above the substrate and electrically coupled to a first control end of a control circuit;
   forming a top electrode above the substrate and electrically coupled to a third control end of the control circuit, where the top electrode is a semi-transparent metal thin film;
   forming a movable electrode above the substrate and between the bottom electrode and the top electrode, and the movable electrode being electrically coupled to a second control end of the control circuit, there being formed insulation material between the movable electrode and the top electrode, and between the movable electrode and the bottom electrode, and a surface of the movable electrode facing the top electrode being a light reflection surface; and
   forming an insulation layer on the movable electrode, wherein the insulation layer comprises a transparent insulation material having a predetermined rigidity;
   wherein the movable electrode is able to move perpendicularly to the light reflection surface to a first position, a second position and a third position, respectively;
   wherein when the movable electrode is at the first position, two parts of a first light incident to the light modulator pixel unit interfere destructively, where one part comprises lights reflected by the top electrode, and the other part comprises lights exiting from the top electrode, after transmitting through the top electrode and being reflected by the movable electrode;
   wherein when the movable electrode is at the second position, two parts of a second light incident to the light modulator pixel unit interfere destructively, where one part comprises lights reflected by the top electrode, and the other part comprises lights exiting from the top electrode, after transmitting through the top electrode and being reflected by the movable electrode;
   wherein when the movable electrode is at the third position, two parts of a third light incident to the light modulator pixel unit interfere destructively, where one part comprises lights reflected by the top electrode, and the other part comprises lights exiting from the top electrode, after transmitting through the top electrode and being reflected by the movable electrode,
   wherein the first, second and third lights are three monochromatic lights; and
   wherein the top electrode, the movable electrode and the bottom electrode have corresponding positions, and the movable electrode has an area smaller than that of the top electrode.

13. The method according to claim 12, wherein the control circuit is formed in the substrate or in another substrate.

14. The method according to claim 12, wherein the bottom electrode is electrically insulated from the substrate, and the top electrode is electrically insulated from the substrate.

15. The method according to claim 12, wherein the top electrode comprises metal, and has a thickness ranging from about 30 angstroms to about 300 angstroms, and the metal is Ag, Al, Cu, Ti, Pt, Au, Ni, Co, or a combination thereof.

16. The method according to claim 12, wherein a sum of thicknesses of the top electrode, the insulation material between the movable electrode and the top electrode, and the insulation layer, is an odd multiple of one fourth of a wavelength of the first light.

17. The method according to claim 12, wherein the first light, the second light and the third light are successively input into the light modulator pixel unit and maintained for a period.

18. The method according to claim 12, further comprising:
   forming an interlayer dielectric (ILD) layer on the substrate; and
   forming a cavity in the ILD layer, where the cavity has cavity walls, and comprises a first portion at a lower part of the cavity and a second portion at an upper part of the cavity;
   where the bottom electrode is formed in the ILD layer between the first portion and the substrate;
   where the top electrode is formed in the ILD layer above the second portion; and
   where the movable electrode is formed in the cavity and spaced away from the cavity walls, so as to hold motion of the movable electrode.

19. The method according to claim 18, wherein the insulation material between the movable electrode and the top electrode, and between the movable electrode and the bottom electrode, applies the ILD layer or is formed additionally.

20. The method according to claim 18, further comprising:
   forming at least one second conducting plugs inside of the ILD layer, where the at least one second conducting plugs electrically couple the second control end and the movable electrode, and the at least one second conducting plugs are central symmetrical with the movable electrode.

* * * * *